Sept. 13, 1932.  H. H. KUHLMANN  1,877,183
SUPPORTING TRAY
Filed April 11, 1931
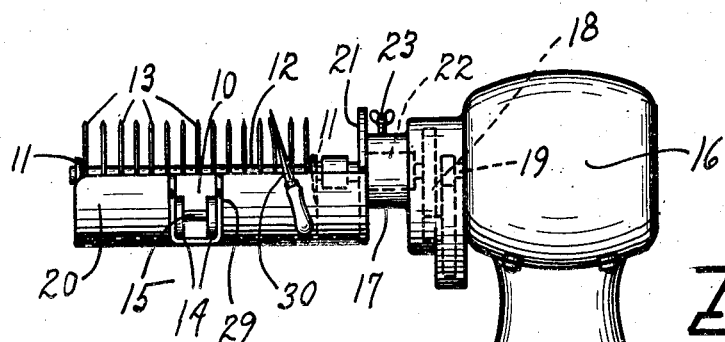
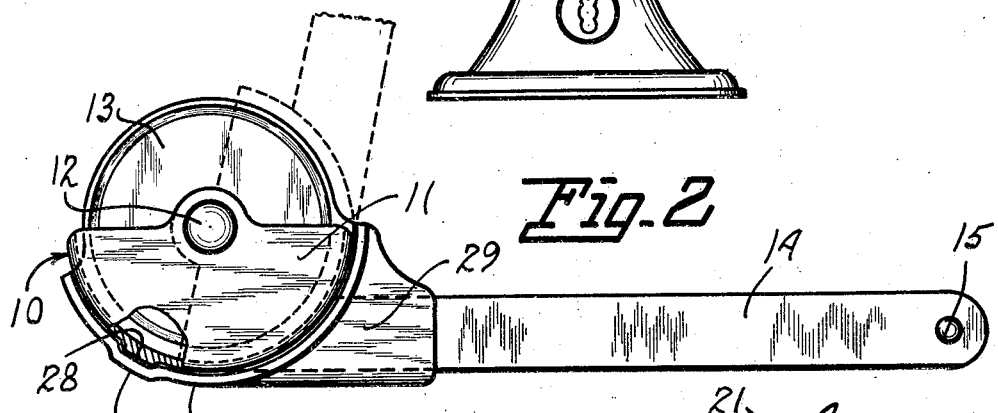
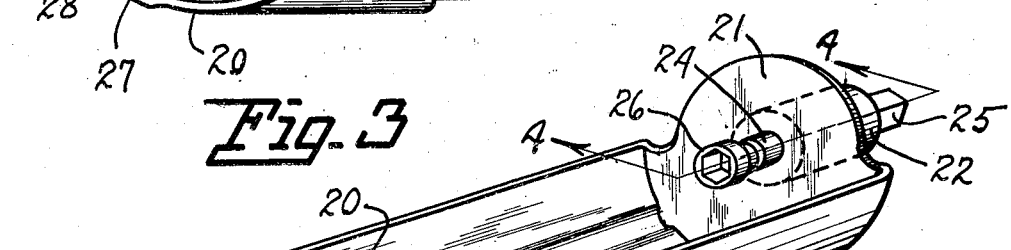
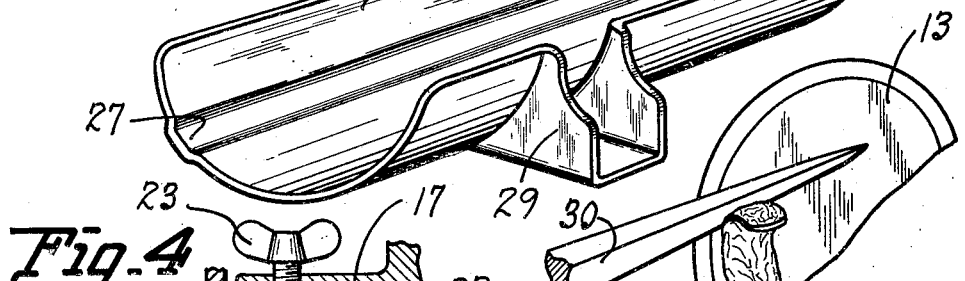
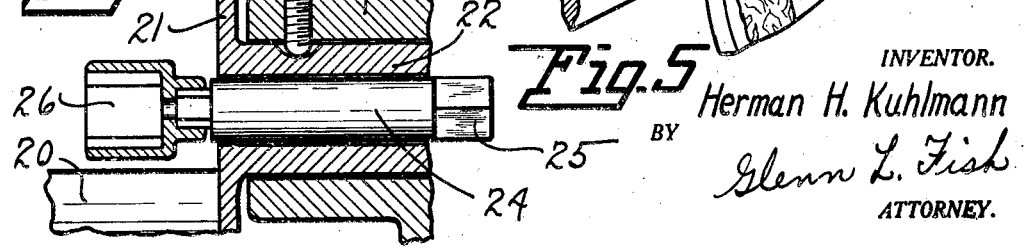
INVENTOR.
Herman H. Kuhlmann
BY
Glenn L. Fish
ATTORNEY.

Patented Sept. 13, 1932

1,877,183

UNITED STATES PATENT OFFICE

HERMAN H. KUHLMANN, OF SPOKANE, WASHINGTON

SUPPORTING TRAY

Application filed April 11, 1931. Serial No. 529,449.

There is at present in common use, a meat tenderer including a shaft supporting a plurality of disk blades, journaled in a substantially semicylindrical frame provided with a handle, by means of which the blades are moved over the meat to score or cube the latter with a view of making it tender. The arrangement and mounting of these blades render the same very difficult to clean from time to time as the occasion requires, as well as to sharpen the blades.

It is therefore the primary object of the present invention to provide a novel construction of means for supporting a device of the above mentioned character in a manner to facilitate both the cleaning and sharpening of the blade.

In carrying out the invention I comprehend the provision of a supporting tray for the device, constructed to permit of the same being quickly associated with or removed from a conventional type of an electric motor, together with means for coupling the shaft of the device to the shaft of the motor, whereby the blades can be rotated while being cleaned or sharpened by a suitable tool.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a view in elevation showing how the device is associated with an electric motor by means of the invention.

Figure 2 is a side elevation of the device removed from the motor but associated with its supporting tray.

Figure 3 is a perspective view of the supporting tray and its associated parts.

Figure 4 is a fragmentary sectional view showing how the tray is supported by the motor casing.

Figure 5 is a view showing how the blades are cleaned while being rotated.

The meat tenderer with which the present invention is designed for use, embodies a substantially semicylindrical frame 10 including opposed end walls 11 between which a shaft 12 is journaled. Carried by this shaft is a plurality of disk blades 13 suitably spaced apart. Projecting from one side of the frame 10 is a handle preferably including spaced parallel sections 14 connected together by a cross pin 15. As hereinabove stated this device is used to score or cube the meat by rolling the disk blades over the same, the device being manipulated by means of the handle 14. These blades require both cleaning and sharpening from time to time, and by reason of the manner in which they are mounted in the frame 10, the undertaking for either purpose is rendered very difficult.

The present invention provides a novel construction of means for associating the shaft 12 of the device with a conventional type of an electric motor indicated generally at 16, which motors are frequently used in conjunction with meat grinders and the like, and include a hollow cylindrical portion 17 in which operate gears 18 driven from the shaft 19 of the motor. One of these gears is provided with a socket to accommodate a shaft adapted to be driven thereby.

The present invention employs a tray 20 of the same cross sectional contour as the frame 10 of the device, in that the frame of the device is adapted to be received and supported by the tray. The tray is open at one end, but provided with a wall 21 at its opposite end, and projecting from this wall is a hub-like portion 22 adapted to be received by the hollow cylindrical portion 17 of the motor casing. A set screw 23 is employed to hold the parts associated as shown in Figure 4. Journaled in the hub-like portion 22 of the tray is a coupling shaft 24 having one end of angular contour as at 25 adapted to be received in the socket of the motor. Carried by the opposite end of the coupling shaft 24, and arranged within the tray is a socket 26 adapted to accommodate the adjacent angular extremity of the shaft 12 of the device. The tray 20 is preferably provided with a shallow longitudinally disposed groove 27 to receive a rib 28 formed on the underside of the frame 10, to prevent relative movement of the frame when it is positioned in the tray, and while the shaft 12 is being rotated from the motor.

When it is desired to either clean or sharpen the disk blades 13 of the device, the latter as a unit is bodily positioned within the tray 20, with one end of the shaft 12 received by the socket 26. The tray, however, is initially associated with the motor casing in a manner hereinabove described, and when the device is being arranged within the tray, it is slightly tilted to position the handle 14 above the upper edge of the tray. However, when the handle is brought to a position directly above the substantially U-shaped extension 29 forming part of the tray, the device is rotated to lower the handle into said extension, during which operation the rib 28 is positioned in the groove 27.

After the handle 14 has been positioned in the extension 29, the entire device is held against longitudinal movement with relation to the tray, while the blades are being cleaned or sharpened. For this purpose a suitable tool 30 preferably of triangular contour in cross section is employed, and arranged against each individual blade. In Figure 5 I have illustrated the manner of using the tool 30 for cleaning the blades, although a sharpening tool is used in the same relation with the blades.

While it is believed that from the foregoing description the nature and advantages of the invention will be readily understood, I desire to have it known that I do not limit myself to what is herein illustrated or described, and that such changes may be resorted to when desired as fall within the scope of what is claimed.

What is claimed is:

1. The combination with a device including a frame having a shaft journaled therein provided with a plurality of spaced disk blades and a handle projecting therefrom, of an electric motor having a shaft and casing, a tray arranged to receive and support said frame, means for detachably connecting the tray to the motor casing, means for coupling the shaft of the device with the shaft of the motor, and an angular shaped extension projecting from the tray arranged to receive the handle whereby the device is held against longitudinal movement with relation to the tray.

2. The combination with a device including a frame having a shaft journaled therein and provided with a plurality of spaced disk blades, and a handle carried by the frame, of an electric motor having a shaft and casing, a tray arranged to receive and support said frame, and having an opening to receive said handle, means for detachably associating the tray with the motor casing, and means carried by the tray for coupling the shaft of the device to the shaft of the motor.

3. The combination with a device including a frame having a shaft journaled therein provided with a plurality of spaced disk blades, and a handle projecting from the frame, of an electric motor comprising a shaft and a casing having a hollow cylindrical portion, a tray including an end wall, a hub-like portion projecting from said end wall arranged to be received by the cylindrical portion of the motor casing, means for holding the tray fixed with relation to the casing, and means journaled in the hub-like portion for coupling the shaft of the device to the shaft of the motor, said tray having an opening to receive said handle.

4. The combination with a device including a substantially semicylindrical frame having a shaft journaled therein provided with a plurality of spaced disk blades, and a handle carried by the frame, of an electric motor having a shaft and casing, a tray arranged to receive and support said frame, and having an opening to accommodate said handle, said tray including an end wall, a hub-like portion projecting from said end wall arranged to be detachably connected with the motor casing, a shaft journaled in said hub-like portion, and means carried by the shaft for coupling the shaft of the device to the shaft of the motor.

In testimony whereof I affix my signature.

HERMAN H. KUHLMANN.